United States Patent
Cheng et al.

(10) Patent No.: US 7,295,952 B1
(45) Date of Patent: Nov. 13, 2007

(54) ENABLING HIGH AVAILABILITY AND LOAD BALANCING FOR JMX MBEANS

(75) Inventors: Michael Cheng, Austin, TX (US); Leigh Allen Williamson, Austin, TX (US); Tom Zhongyu Zhou, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/420,019

(22) Filed: May 24, 2006

(51) Int. Cl.
*G06F 19/00* (2006.01)

(52) U.S. Cl. .......................................... 702/185; 340/3.1
(58) Field of Classification Search ................ 702/185, 702/182–184, 188; 714/25
See application file for complete search history.

(56) References Cited

U.S. PATENT DOCUMENTS

2006/0293060 A1* 12/2006 Yang et al. ................. 455/453

* cited by examiner

*Primary Examiner*—Edward Raymond
(74) *Attorney, Agent, or Firm*—Mark S. Walker; Gregory K. Goshorn; Greg Goshorn, P.C.

(57) ABSTRACT

Provided is a method for programming module load balancing and failover in a distributed computing environment. The Java Management extensions (JMX) specification is enhanced to support load balancing and provide a high-availability of JMX management beans (Mbeans). Also provided are enhancements to the programming model and infrastructure to support the enhanced programming model. Two exemplary approaches for load balancing and failover are provided, one based both upon clustered Mbeans and one based upon unclustered Mbeans. In the unclustered approach, client affinity is supported in that a request from a particular client can be routed to a particular Mbean. In the clustered approach, a specific Mbean can be invoked by providing a special parameter in the Mbean invocation or by adding a special property to the specific Mbean's ObjectName to indicate that during runtime automatic routing should not be employed.

18 Claims, 5 Drawing Sheets

ENABLING HIGH AVAILABILITY AND LOAD BALANCING FOR JMX MBEANS

TECHNICAL FIELD

The present invention relates generally to a computing system and, more specifically, to a method for providing load balancing and resource reliability in a distributed computing environment.

BACKGROUND OF THE INVENTION

For the past several decades, computers have become increasingly connected. Originally, computers were stand-alone devices, each typically designed and programmed for a specific task. Soon however, the advantages of combining computers into networks became apparent. Networks of computers were able to share resources such as printers and memory and eventually even able to share, or distribute, processing tasks. For example, a search of a large database can often be broken into multiple, mutually exclusive tasks by assigning different processors and/or computers to search different segments of the database.

As computers have become increasingly interconnected, techniques have been developed to enable multiple computers to work together. One such development is Java, a high-level programming language originally developed by Sun Microsystems, Inc. of Mountain View, Calif. Java enables programmers to develop code that is platform independent. Simply stated, code written in the Java programming language is converted, or "interpreted," into actual computer instructions corresponding to a particular computer by a Java Virtual Machine (JVM) that executes on the computer. In other words, by installing a JVM that corresponds to particular computer hardware and the associated operating system, a programmer can write code without regard to the particular hardware and operating system.

In addition to the increased connectivity of traditional computers, many devices that incorporate computing components have also become both inter-connected and Java-enabled. Examples include Internet, or "web," telephones, cable boxes and televisions and application clients and servers. To facilitate the management of such Java-enable resources, Java Management Extensions (JMX) has been developed. JMX is a standard for managing and monitoring devices, applications and services in a Java environment. JMX defines a management architecture, design patterns, application programming interfaces (APIs), and services for building web-based, distributes, dynamic and modular solutions to manage Java resources.

JMX provides for the creation and implementation of Java managed beans, or "Mbeans," which are programming objects that represent objects to be managed. Each Mbean has a management interface that enables a user or program to monitor, manage and be notified of changes to particular configuration parameters of a corresponding resource. For example, an Mbean representing an application may include attributes and methods corresponding to the application's cache size. In this example, reading a "cacheSize" attribute would return the application's cache size and writing a "cacheSize" attribute would update the size of the application's cache, thus changing the application's configuration.

Although the JMX specification has been updated to include invocation between client and server in a distributed environment, the specification still does not address any type of load balancing or contingencies in the event an Mbean fails to execute. What are needed are techniques to address Mbean load balancing and failover.

SUMMARY OF THE INVENTION

Provided is a method for programming module load balancing and failover in a distributed computing environment. The following examples address how the Java Management extensions (JMX) specification can be enhanced to support load balancing and provide a high-availability of JMX management beans (Mbeans). Included in the following disclosure are enhancements to the programming model and infrastructure needed to support the enhanced programming model.

Two exemplary approaches and multiple scenarios for load balancing and failover based upon clustered and unclustered Mbeans respectively are described. In one scenario of the unclustered Mbean approach, there is a single instance of an Mbean in which, when that single instance fails, another instance of the Mbean is created, either on the same or a different server. The new instance of the Mbean is accessed using the same ObjectName as the original Mbean.

In a second scenario of the unclustered Mbean approach, multiple, similar Mbeans may be instantiated with one of the Mbeans designated to process all requests. The remaining Mbeans serve as backups and, in the event of a processing request failure one of the remaining Mbeans is designated to process requests. Client affinity is supported in that a request from a particular client is routed to a particular Mbean, until such time as that particular Mbean fails. In the unclustered approach, each Mbean is referenced by a unique ObjectName property. However, regardless of the ObjectName used, the invocation reaches the current Mbean processing the requests.

In one scenario of a clustered approach to load balancing, one or more logical ObjectName properties are employed to identify a cluster of Mbeans. The user of a particular Mbean does not need to be aware of either where an Mbean is located or how many Mbeans are within a particular cluster. A query or command directed to a particular ObjectName results in a single result from a single Mbean.

In a second scenario of the clustered approach to load balancing, each Mbean in a particular cluster has a unique ObjectName property but each Mbean shares a particular naming pattern. When querying the cluster, all Mbeans whose ObejectName properties that include a pattern of the query may return a result. When invoking an Mbean, all ObjectNames that include a particular pattern are equivalent in that a runtime infrastructure routes a request to an available Mbean, regardless of the ObjectName used for the request. A specific Mbean in a cluster can be invoked by providing a special parameter in the Mbean invocation or by adding a special property to the specific Mbean's ObjectName to indicate that during runtime automatic routing should not be employed.

BRIEF DESCRIPTION OF THE DRAWINGS

A better understanding of the present invention can be obtained when the following detailed description of the disclosed embodiments is considered in conjunction with the following drawings.

DETAILED DESCRIPTION OF THE FIGURES

Although described with particular reference to the Java Management Extensions (JMX) standard, the claimed subject matter can be implemented in any information technology (IT) system in which load balancing and resource reliability is desirable. Those with skill in the computing arts will recognize that the disclosed embodiments have relevance to a wide variety of computing environments in addition to those described below. Further, although described with respect to Java management beans (MBeans) and the JAVA environment, the claimed subject matter also is applicable to modules, applications or any other type of interdependent computer logic. In other words, the disclosed technology is applicable to any situation in which there is interdependent computer code and a user or developer needs or wants to ensure that the computing environment is highly reliable.

In addition, the methods of the disclosed invention can be implemented in software, hardware, or a combination of software and hardware. The hardware portion can be implemented using specialized logic; the software portion can be stored in a memory and executed by a suitable instruction execution system such as a microprocessor, personal computer (PC) or mainframe.

In the context of this document, a "memory" or "recording medium" can be any means that contains, stores, communicates, propagates, or transports the program and/or data for use by or in conjunction with an instruction execution system, apparatus or device. Memory and recording medium can be, but are not limited to, an electronic, magnetic, optical, electromagnetic, infrared or semiconductor system, apparatus or device. Memory an recording medium also includes, but is not limited to, for example the following: a portable computer diskette, a random access memory (RAM), a read-only memory (ROM), an erasable programmable read-only memory (EPROM or flash memory), and a portable compact disk read-only memory or another suitable medium upon which a program and/or data may be stored.

Figure 1:
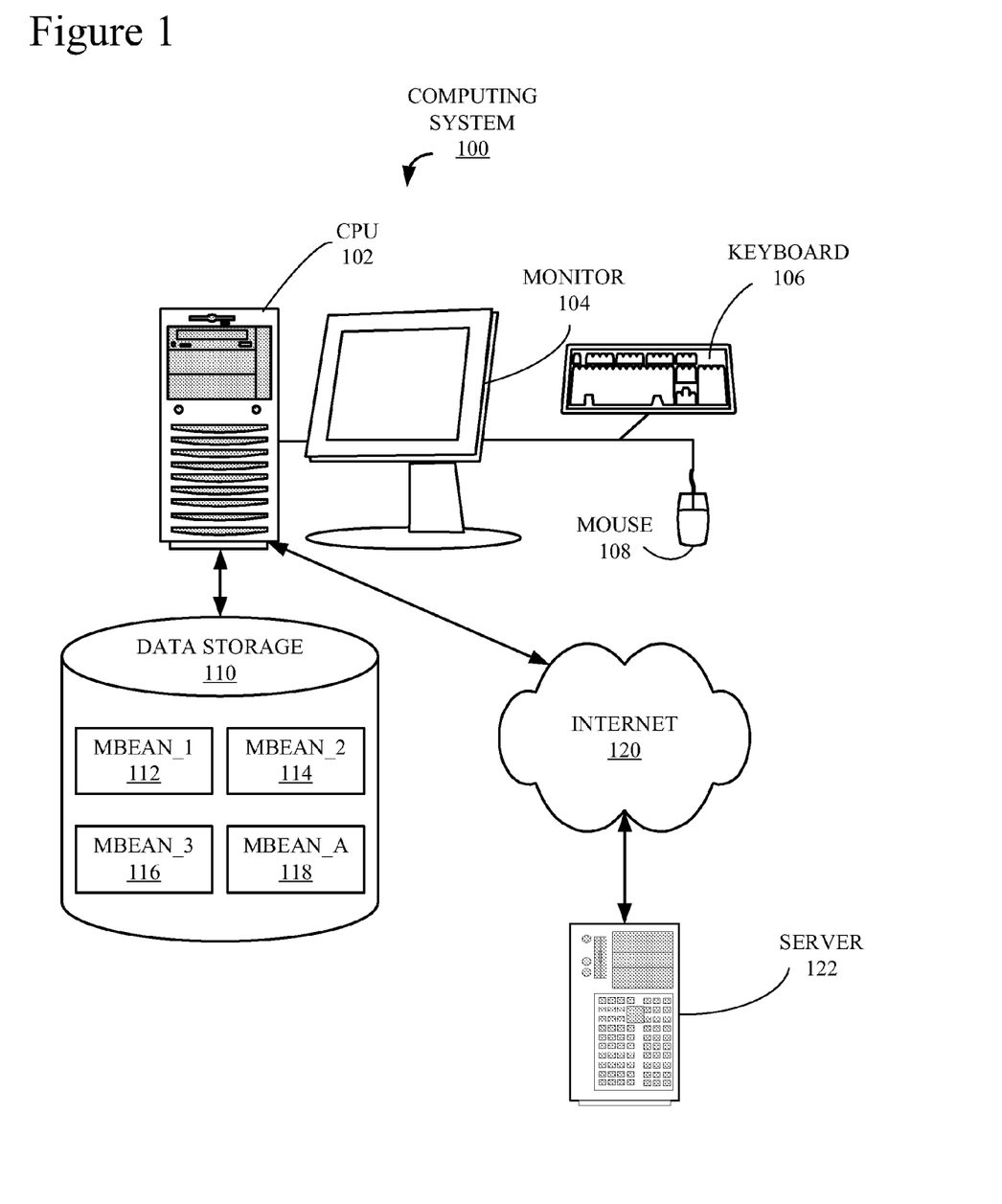
FIG. 1 is a block diagram of an exemplary computing system that employs the claimed subject matter.

Turning now to the figures, FIG. 1 is a block diagram of an exemplary computing system architecture 100 that incorporates the claimed subject matter. A central processing unit (CPU) 102 is coupled to a monitor 104, a keyboard 106 and a mouse 108, which together facilitate human interaction with computing system 100. Attached to CPU 102 is a data storage component 110, which may either be incorporated into CPU 102 i.e. an internal device, or attached externally to CPU 102 by means of various, commonly available connection devices such as but not limited to, a universal serial bus (USB) port (not shown). Data storage 110 is illustrated storing several exemplary Java Management bundles, or "Mbeans,", including a first Mbean, or "Mbean_1," 112, a second Mbean, or "Mbean_2," 114, a third Mbean, or "Mbean_3," 116 and a fourth Mbean, or "Mbean_A," 118. The significance of the names of Mbeans 112, 114, 116 and 118 with respect to the following description is explained in more detail below in conjunction with FIG. 2. It should be noted that a typical application or system may include many Mbeans, but for the sake of simplicity only four are shown.

CPU 102 is connected to the Internet 120, which is also connected to a server computer 122. Although in this example, CPU 102 and server 122 are communicatively coupled via the Internet, they could also be coupled through any number of communication mediums such as, but not limited to, a local area network (LAN) (not shown).

Figure 2:
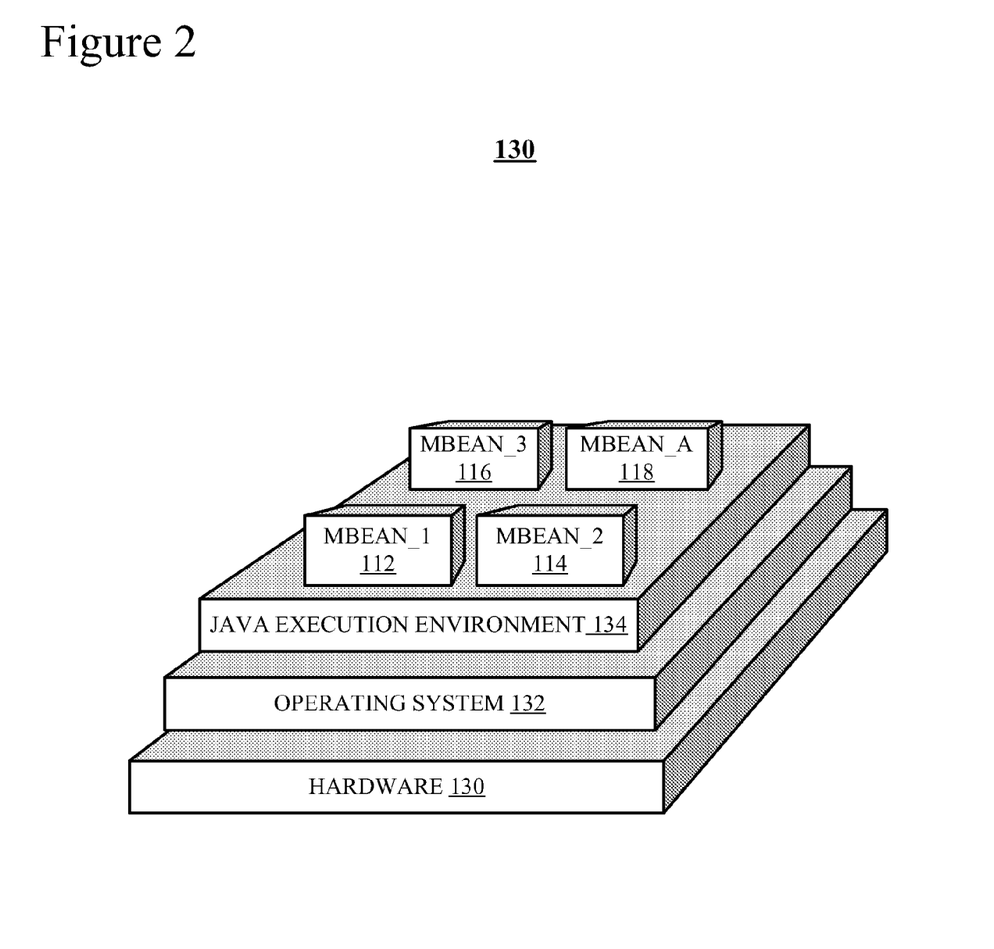
FIG. 2 is a block diagram of an exemplary computer architecture that executes on the computing system of FIG. 1 and supports the techniques of the claimed subject matter.

FIG. 2 illustrates an exemplary computing architecture 130 that supports a Java Execution environment (JXE) 134 and the claimed subject matter. System 130 is implemented on a hardware platform 130, which in the following examples is CPU 102 (FIG. 1). Other possible platforms include, but are not limited to, such computing platforms as server 122 (FIG. 1), television set top boxes, service gateways, cable modems, consumer electronic devices, personal computers (PCs), industrial computers and automobiles. An operating system (OS) 132 manages the resources of hardware 102. Examples of three OSs that support the claimed subject matter include Linux, MacIntosh and the various versions of Windows, all of which, as well as others, should be familiar to those with skill in the computing arts.

As mentioned above, in this example, OS 132 is supporting JXE 134 and JXE 134 supports the Java programming language, which is a product of Sun Microsystems, Inc. of Santa Clara, Calif. JXE 134 includes a Java runtime engine (JRE) (not shown) which executes Java programs, Java programs are compiled into byte codes which are interpreted by the JRE of JXE 134 rather then being compiled into native machine code. In this manner, a particular Java program can be written to execute on any hardware platform 102 and OS 132 that includes the JXE 134.

JXE 134 provides an execution environment for, among other things, Mbeans, which in this example include Mbean_1 112 (FIG. 1), Mbean_2 114 (FIG. 1), Mbean_3 116 (FIG. 1) and Mbean_A 118 (FIG. 1). In the following description, Mbeans 112, 114 and 116 are used as examples of Mbeans grouped into an Mbean cluster, as indicated by the fact that they are named according to a particular convention, i.e. "Mbean #," which indicates that the names are composed of the word "Mbean," a '_' character and a numeric character. In the following description, Mbean_A 118 is used as an example of a single instance of an unclustered Mbean, as indicated that the fact that the term "Mbean_A" does not follow the pattern for defining the cluster associated with Mbeans 112, 114 and 116, i.e. the character 'A' is not numeric. Although Mbeans 112, 114 and 116 are illustrated as all residing on hardware platform 102, each of Mbeans 112, 114 and 116 could be located on different platforms, e.g. stored in memory (not shown) associated with server 122 (FIG. 1) and executed on server 122.

Figure 3:
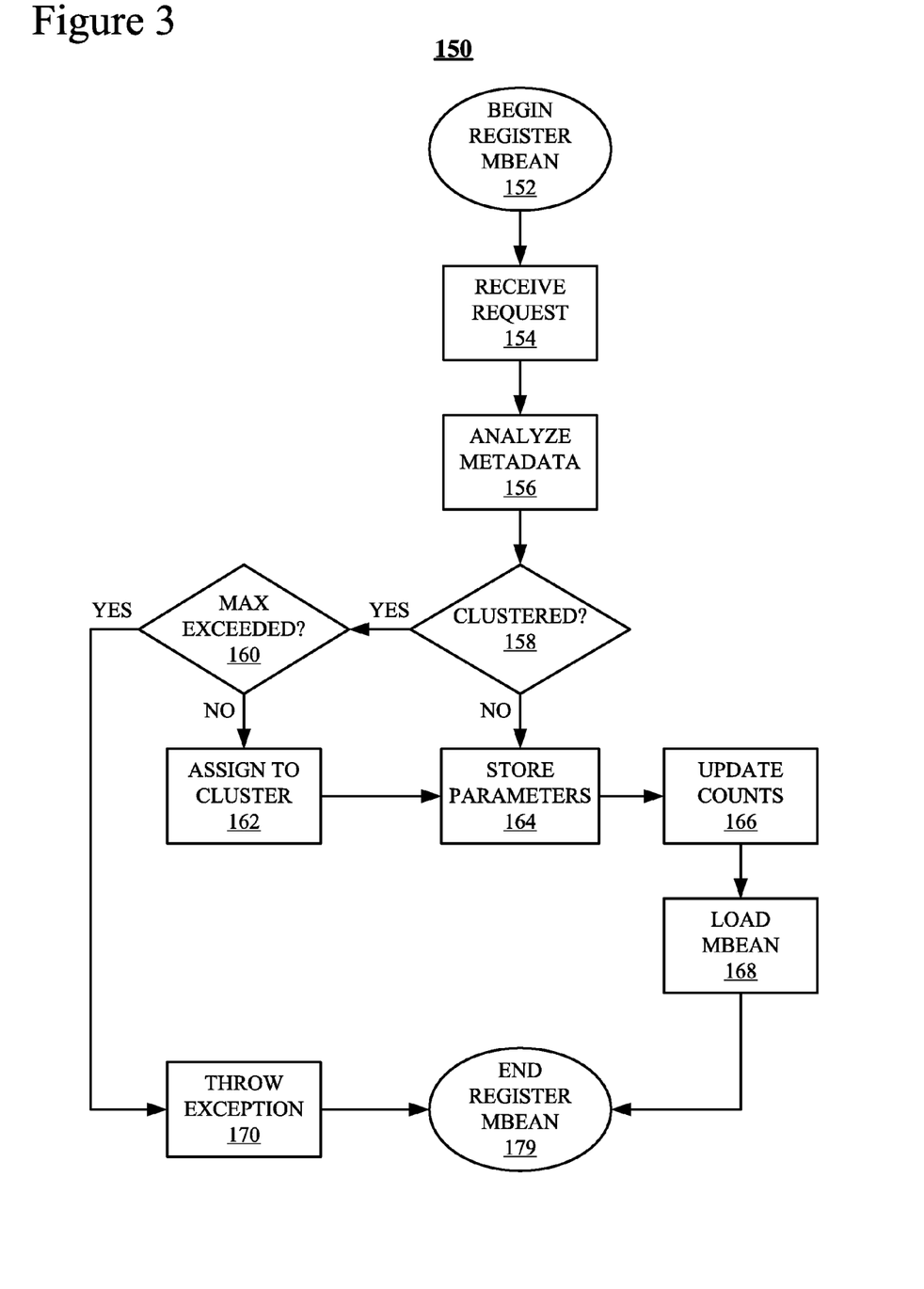
FIG. 3 is a flowchart of an exemplary Mbean Register process for implementing aspects of the claimed subject matter.

FIG. 3 is a flowchart of an exemplary Mbean Register process 150 for implementing aspects of the claimed subject matter. Process 150 starts in a "Begin Register Mbean" block 152 and proceeds immediately to a "Receive Request" block 154. During block 154, process 150 receives a request from a client (not shown) to register a particular Mbean, such as Mbean 112, 114, 116 or 118 (FIGS. 1 and 2), with JXE 134 (FIG. 2). During an "Analyze Metadata" block 156, process 150, which is executed by JRE of JXE 134, examines information, or metadata, received in conjunction with the particular Mbean, or target Mbean, corresponding to the request received during block 154. The information may be either incorporated into the target Mbean as specific attributes or provided as part of the call that loads the particular Mbean. An example of a type of information that is transmitted in conjunction with the MBean includes, but is not limited to, whether or not the loaded Mbean is associated with a particular cluster of Mbeans. Cluster information may also include a number or maximum number of Mbeans in an associated cluster. Some cluster information may be included with the registration request or, in the alternative, inferred from specified naming conventions as explained above in conjunction with FIG. 2.

Another exemplary piece of information that may be associated with a particular Mbean is whether or not the methods of the Mbean are "retryable." A particular method is retryable if a second call with parameters identical to a first call may yield the same or different yet relevant results. One example is an Mbean that returns performance statistics that change from moment to moment.

During a "Clustered?" block 158, process 150 determines, based upon the information received during block 156, whether or not the registration request received during block 154 corresponds to an Mbean that is organized as part of a cluster of Mbeans. If so, process 150 proceeds to a "Max Exceeded?" block 160 during which process 150 determines whether or not the cluster to which the target Mbean has a upper limit upon the number of Mbeans that can be instantiated in conjunction with the cluster and, if so, whether or not that maximum would be exceeded by instantiating the target Mbean. If the maximum would be exceeded, process 150 proceeds to a "Throw Exception" block 170 during which process 150 takes action appropriate to the circumstances. An example of such action may be to transmit a message to the user or program that initiated process 150. Once the exception has been thrown, process 150 proceeds to an "End Register Mbean" block 179 in which process 150 is complete. It should be noted that the execution path represented by blocks 160 and 170 does not result in the instantiation of the target Mbean.

If during block 160 process 150 determines that the instantiation of the target Mbean would cause any parameters to be exceeded, control proceeds to an "Assign to Cluster" block 162 during which the target Mbean is associated with the appropriate cluster. For example, if the target Mbean is Mbean_3 116 (FIGS. 1 and 2) and Mbean_1 112 has already been instantiated, then Mbean_3 116 is associated with Mbean_1 112.

If process 150 determines during block 158 that the target Mbean is not part of a cluster of Mbeans or once the target Mbean is associated with a cluster during block 162 process 150 proceeds to a "Store Parameters" block 164 during which process 150 stores in memory the parameters associated with the metadata received during block 156. During an "Update Counts" block 166, process 150 updates any system parameters that may be affected by the instantiation of the target Mbean. For example, the number of Mbeans within a particular cluster is updated so that the system can prevent the number of Mbeans in the cluster from exceeding some maximum number.

During a "Load Mbean" block 168 process 150 calls an initiator method associated with the target Mbean, which is then loaded into the system. Finally, process 150 proceeds to End Register Mbean block 179 in which, as explained above, process 150 is complete.

Figure 4:
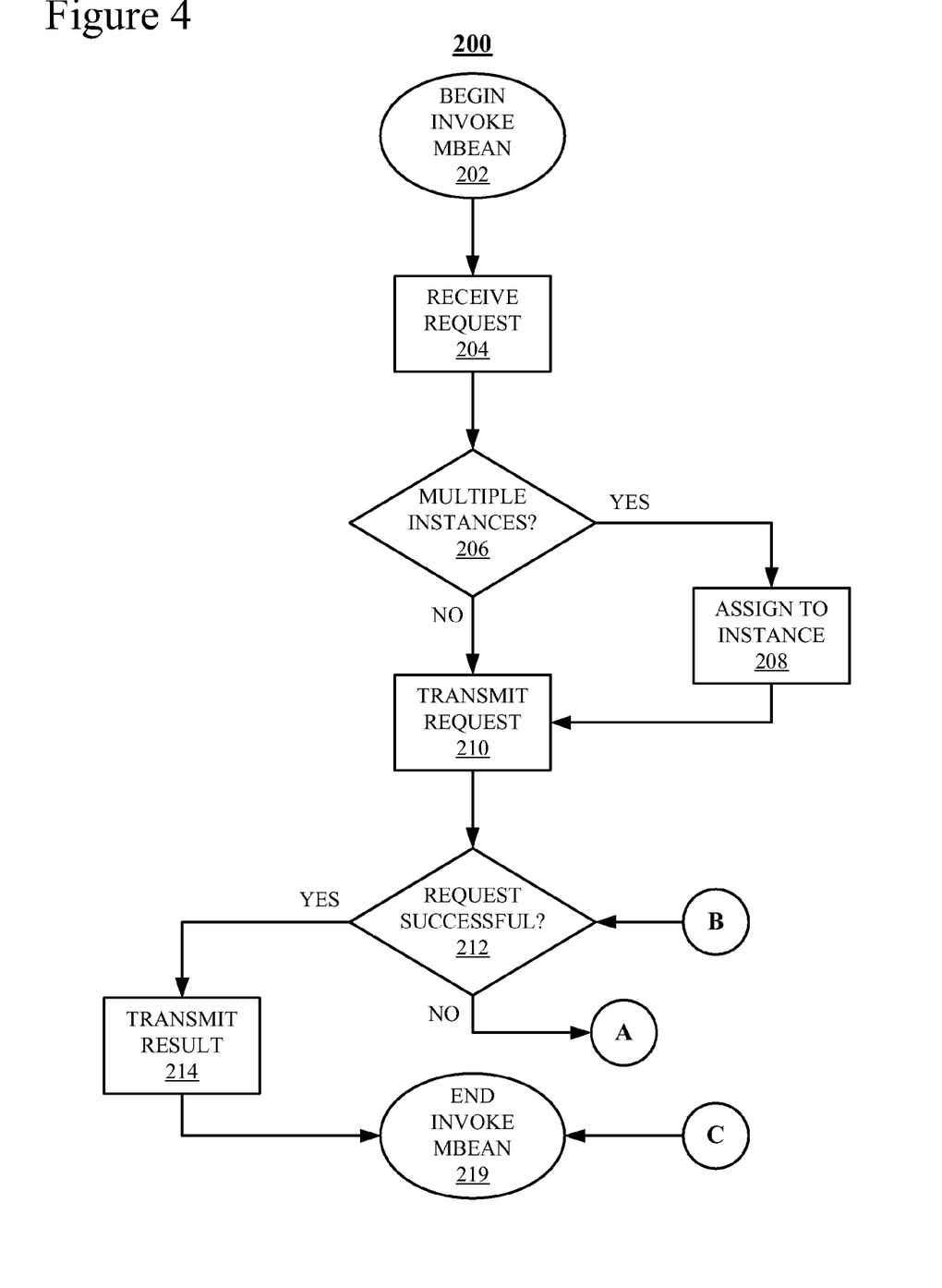
FIG. 4 is a flowchart of an exemplary Invoke Mbean process for implementing aspects of the claimed subject matter.

FIG. 4 is a flowchart of an exemplary Invoke Mbean process 200 for implementing aspects of the claimed subject matter. Process 200 starts in a "Begin Invoke Mbean" block 202 and proceeds immediately to a "Receive Request" block 204. During block 204, JXE 134 (FIG. 2) receives from a user, program or Mbean a request to invoke a method of a particular Mbean, such as for the sake of example Mbean_1 112 (FIGS. 1 and 2). As described above in conjunction with the Background, an Mbean is a programming object that represents an object to be managed. Each Mbean has a management interface that enables a user or program to monitor, manage and be notified of changes to particular configuration parameters of a corresponding resource.

Process 200 then proceeds to a "Multiple Instances?" block 206 during which process 200 determines whether or not there are multiple instantiations of the Mbean. If not, process 200 proceeds to a Transmit Request block 210 during which the request received during block 204 is transmitted to the subject Mbean. As explained above in conjunction with FIG. 3, the existence of multiple instances of a particular Mbean implies that the Mbean is either associated with a cluster of Mbeans or one of two or more instantiations of the same Mbean. Whether or not a particular Mbean is associated with a cluster may be determined on the basis of metadata provided during register Mbean process 150 or inferred from specified naming conventions.

If during block 206 process 200 determines there are multiple instances of Mbeans, either in as part of a cluster of Mbeans or multiple instances of a particular Mbean, process 200 proceeds to an "Assign to Instance" block 208. During block 208, process 200 selects a particular instantiation to which to transmit the request received during block 204. As explained above in conjunction with the Summary, JXE 134 typically determines a particular Mbean instance to which to transmit the request based upon load balancing factors for clustered Mbeans or upon which particular Mbean is currently processing requests for un-clustered Mbeans.

Those with skill in the computing arts should appreciate that there are several possible load balancing schemes and how various factors are employed to execute any particular scheme. The claimed subject matter also supports client affinity or, in other words, a specific Mbean in a cluster can be invoked by providing a special parameter in the Mbean invocation. Once the request received during block 204 is assigned to particular Mbean, process 200 proceeds to block 210 during which, as described above, the request is transmitted to the appropriate Mbean.

During a "Request Successful?" block 212, process 200 determines whether or not the request transmitted during block 210 was successfully completed. If not, process 200 proceeds to a transition point A. Transition point A leads to an execution path described in more detail below in conjunction with FIG. 5. The execution path described in conjunction with FIG. 5 reenters the portion of process 200 described in conjunction with FIG. 4 at block 212 from a transition point B or at an "End Invoke Mbean" block 219 from a transition point C.

If during block 212 process 200 determines that the request transmitted during block 210 was executed successfully, process 200 proceeds to a "Transmit Result" block 214 during which the result of the operation, typically either requested information or a signal that the request has been successfully completed, is transmitted to the user, program or Mbean that initiated the request received during block 204. Process 200 then proceeds to End Invoke Mbean block 219 in which process 200 is complete.

Figure 5:
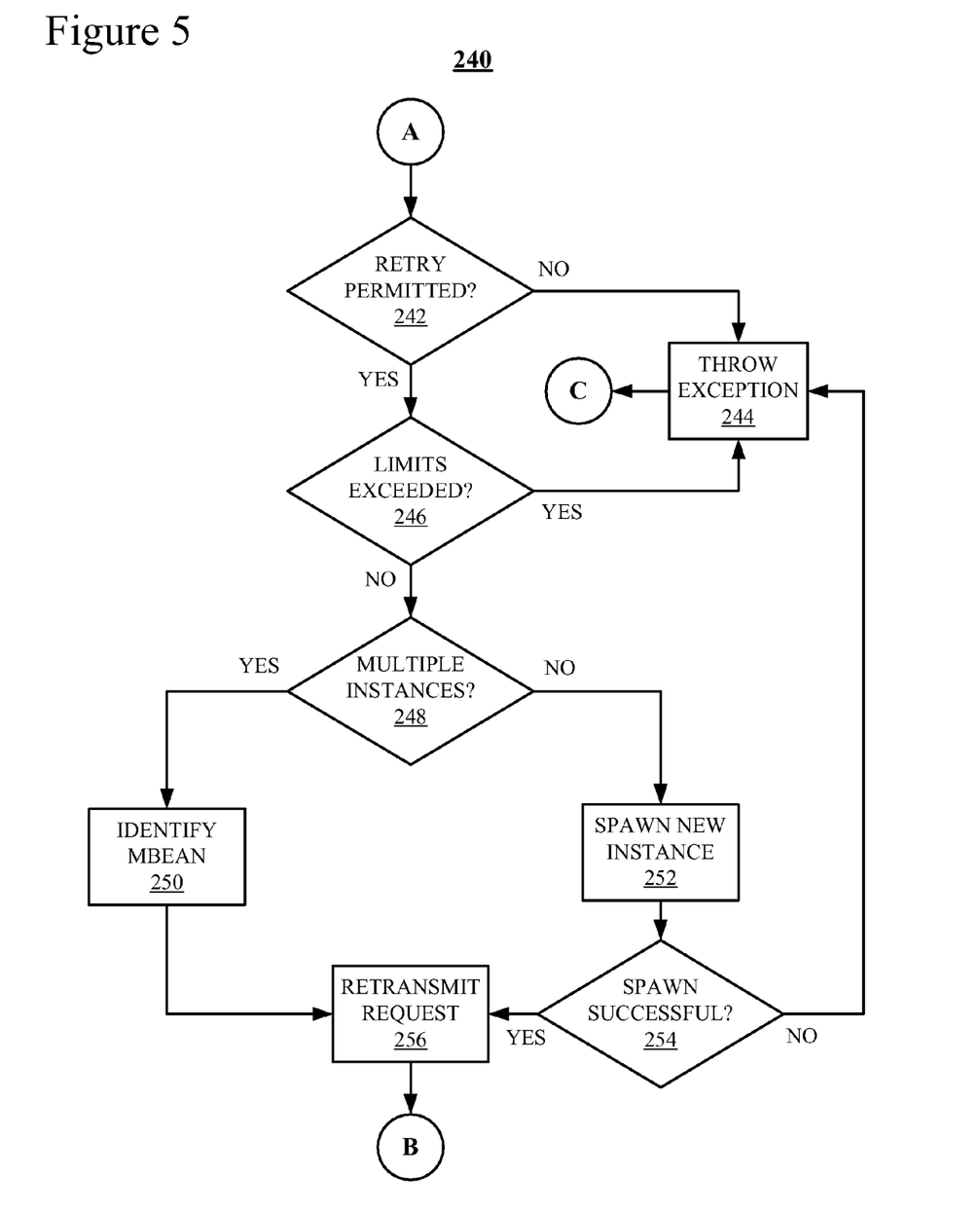
FIG. 5 is a flowchart showing an Invocation Recovery path of the Invoke Mbean process of FIG. 4 in more detail.

FIG. 5 is a flowchart showing an Invocation recovery path 240 of Invoke Mbean process 200 of FIG. 4 in more detail. Path 240 is entered from Request Successful? block 216 (FIG. 4) via transition point A (FIG. 4) when a corresponding method call has been detected to have been unsuccessful. Control proceeds immediately from transition point A to a "Retry Permitted?" block 242. During block 242, process 200, i.e. execution path 240, determines whether of not the method of the target Mbean is retryable. As explained above in conjunction with FIG. 3, a particular method of Mbean is retryable if a second call with parameters identical to a first call may yield the same or different yet relevant results, which may be true even though the results change, such as in the case of an Mbean that returns performance statistics. Path 240 makes the determination of "retryability" based upon information provided during Receive Request block 154 (FIG. 3) and parsed during Analyze Metadata block 156 of Register Mbean process 150 (FIG. 3). If path 240 determines that the method or Mbean is not retryable, control proceeds to a "Throw Exception" block 244 during which path 240 takes appropriate action to clean up the computing environment and notify the user, program or Mbean that invoked the call. Once the exception has been thrown, path 240 returns via transition point C to End Invoke Mbean block 229 in which process 200 is complete.

If during block 242 path 240 determines that a retry of the invoked method is allowed, control proceeds to a "Limits Exceeded?" block 246 during which path 240 determines whether or not the targeted Mbean has reached a limit on the number of permissible retries. This limit may be either a system limit or defined for a particular Mbean or Mbean cluster. The purpose of a retry limit is to prevent an endless loop of retries to a particular broken or unavailable Mbean or cluster of Mbeans. If path 240 determines that the retry limit has been exceeded, control proceeds to Throw Exception block 244 and processing continues as described above.

If during block 246 path 240 determines that the retry limit has not been exceeded, control proceeds to a "Multiple Instances?" block 248 during which path 240 determines whether or not the target Mbean has multiple copies available for processing. If so, path 240 proceeds to Identify Mbean block 250 during which path 240 identifies a copy of the target Mbean. The multiple copy identified can be either one of a cluster associated with the targeted Mbean or, in an unclustered configuration, an available backup member associated with the targeted Mbean. Path 240 proceeds to Retransmit Request block 258 during which the request method is invoked in an Mbean identified during block 250.

If during block 248 path 240 determines that there are not duplicate copies of the target Mbean, path 240 proceeds to a "Spawn New Instance" block 252 during which path 240 attempts to spawn, or load, a new copy of the target Mbean (see process 150, FIG. 3). Path 240 then proceeds to a "Spawn Successful?" block 254 during which path 240 determines whether or not the attempt to spawn a new Mbean was successful. If not, control proceeds to Throw Exception block 244 during which processing continues as described above. If in block 254 path 240 determines that a new Mbean has been successfully loaded, then control proceeds to Retransmit Request block 256 during which the requested method is invoked in an Mbean either loaded during block 252 or identified during block 250. Finally, control proceeds from block 256 to Request Successful? block 216 (FIG. 4) via transition point B and processing continues as described above in conjunction with FIG. 4.

While the invention has been shown and described with reference to particular embodiments thereof, it will be understood by those skilled in the art that the foregoing and other changes in form and detail may be made therein without departing from the spirit and scope of the invention, including but not limited to additional, less or modified elements and/or additional, less or modified blocks performed in the same or a different order.

We claim:

1. A method for providing fault tolerance in a computing environment, comprising defining a plurality of equivalent management modules corresponding to the computing environment; detecting a call to a particular management module of the plurality of equivalent management modules; determining a comparative load factor associated with each management module of the plurality of equivalent management modules; transmitting the call to a management module of the plurality of equivalent management modules determined to have the lowest load factor, further comprising: identifying in conjunction with the call a specific management module of the plurality of management modules to which to transmit the call; and transmitting the call to the identified management module rather than to the management module determined to have the lowest load factor.

2. The method of claim 1, wherein each of the plurality of management modules is associated with metadata that defines the characteristics of the corresponding management module.

3. The method of claim 1, further comprising:
    loading into the computing system an additional management module equivalent to each module of the plurality of modules; and
    transmitting the call to the additional management module rather than the management module of the plurality of equivalent management modules determined to have the lowest load factor.

4. The method of claim 1, wherein the equivalent management modules form a cluster of management modules.

5. The method of claim 1, wherein the equivalent management modules are multiple instantiations of the same management module and each are addressed by the same object name.

6. The method of claim 1, wherein the equivalent management modules are multiple instantiations of the same management module and each are addressed according to a corresponding object name generated according to a predefined pattern.

7. A fault tolerant computing system, comprising: a plurality of equivalent management modules corresponding to a computing environment; logic for detecting a call to a particular management module of the plurality of equivalent management modules; logic for determining a comparative load factor associated with each management module of the plurality of equivalent management modules; logic for transmitting the call to a management module of the plurality of equivalent management modules determined to have the lowest load factor, further comprising: logic for identifying in conjunction with the call a specific management module of the plurality of management modules to which to transmit the call; and logic for transmitting the call to the identified management module rather than to the management module determined to have the lowest load factor.

8. The system of claim 7, further comprising metadata, associated with each management module, that defines the characteristic of the corresponding management module.

9. The system of claim 7, further comprising:
    logic for loading into the computing system an additional management module equivalent to each module of the plurality of modules; and
    logic for transmitting the call to the additional management module rather than the management module of the plurality of equivalent management modules determined to have the lowest load factor.

10. The system of claim 7 wherein the equivalent management modules form a cluster of management modules.

11. The system of claim 7, wherein the equivalent management modules are multiple instantiations of the same management module and each are addressed by the same object name.

12. The system of claim 7, wherein the equivalent management modules are multiple instantiations of the same management module and each are addressed according to a corresponding object name generated according to a predefined pattern.

13. A computer programming product, comprising:
a memory;
a plurality of equivalent management modules, stored on the memory, corresponding to a computing environment;
logic, stored on the memory, for detecting a call to a particular management module of the plurality of equivalent management modules;
logic, stored on the memory, for detecting a call to a particular management module of the plurality of equivalent management modules;
logic, stored on the memory, for determining a comparative load factor associated with each management module of the plurality of equivalent management modules;
logic, stored on the memory, for identifying in conjunction with the call a specific management module of the plurality of management modules to which to transmit the call; and
logic, stored on the memory, for transmitting the call to the identified management module.

14. The computer programming product of claim 13, further comprising metadata, stored on the memory, associated with each management module, that defines the characteristic of the corresponding management module.

15. The computer programming product of claim 13, further comprising:
logic, stored on the memory, for loading into the computing system an additional management module equivalent to each module of the plurality of modules; and
logic, stored on the memory, for transmitting the call to the additional management module rather than the management module of the plurality of equivalent management modules determined to have the lowest load factor.

16. The computer programming product of claim 13, wherein the equivalent management modules form a cluster of management modules.

17. The computer programming product of claim 13, wherein the equivalent management modules are multiple instantiations of the same management module and each are addressed by the same object name.

18. The computer programming product of claim 13, wherein the equivalent management modules are multiple instantiations of the same management module and each are addressed according to a corresponding object name generated according to a predefined pattern.

* * * * *